M. MELLINGER.
Cooking Stove.
No. 86,854. Patented Feb. 9, 1869.
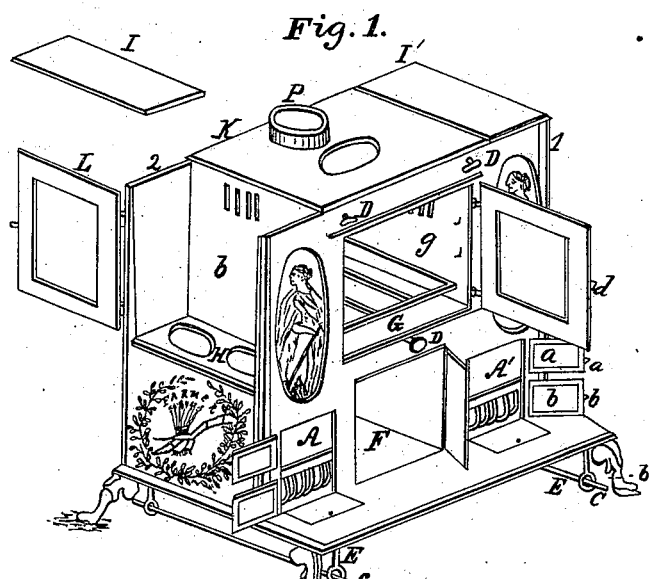
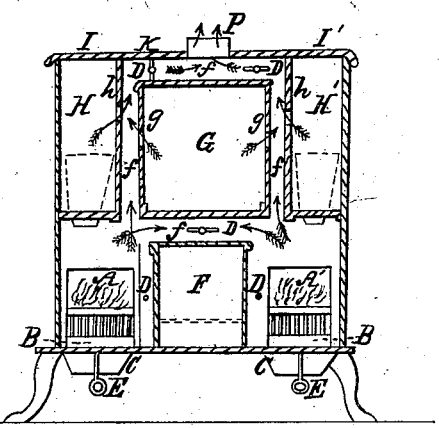
Witnesses:
W. B. M[...]
Jacob Stauffer
Inventor:
Mary Mellinger

MARY MELLINGER, OF UPPER LEACOCK TOWNSHIP, PENNSYLVANIA.

Letters Patent No. 86,854, dated February 9, 1869.

IMPROVEMENT IN COOKING-STOVES.

The Schedule referred to in these Letters Patent and making part of the same.

*To all whom it may concern:*

Be it known that I, MARY MELLINGER, of Upper Leacock township, in the county of Lancaster, and State of Pennsylvania, have invented a new and useful Arrangement on Cook-Stoves; and I hereby declare that the following is a full and exact description of the construction and operation of the same, reference being had to the accompanying drawings, making a part of this specification, in which—

Figure 1 is a perspective view of the stove, with the doors thrown open, and the removable plate I on one side removed.

Figure 2 is a vertical section, showing the plan of the grates and fire-pots A A', on each side of two ovens, G F, and flues, *f*.

The dotted lines across the lower portion of the oven F, indicate the position of an additional flue, with side dampers to throw or circulate the heat beneath, as well as on the sides and top, for roasting-purposes.

The nature of my invention consists in providing, not only two fire-grates, adapted for coal, and, by removing the grate, equally well adapted for wood, but also, in the arrangement of the boiler-openings, or griddles, on the sides of central ovens, with intervening flues to carry off the smoke, and prevent the fumes of cooking to enter the room, and, in other respects, so arranged as to make it convenient for culinary purposes.

The drawings clearly indicate the nature of the combination and arrangement of this stove, so as to enable those skilled in the art to make and use the same.

The novelty consists mainly in the open recesses in the narrow sides and central ovens. The front and one end are shown by fig. 1.

Two fire-places, with removable grates A A', are shown, with an oven, F, for roasting, below, and an oven, G, for baking, centrally in the stove, with doors *o*, front and rear.

The oven G has slide-valves *g*, to admit any vapor or fumes to enter the flues *f*, when the doors are closed.

The grate and ash-pans *c*, fig. 2, are of ordinary construction, as are the several dampers, D, to change the draught.

The front and rear plates 1, 2, extend the full width of the base, or fire-pots, to the top, leaving an open recess, H, provided with griddles and perforations for a pair of boilers on each side.

A door, L, closes the front, and a loose plate, I, covers the top, so as to enclose the boilers.

There is also a slide-valve, *h*, to allow steam or fumes to pass into the flues, as shown.

K is the permanent top.

P, collar for the pipe, as also an opening for a boiler.

Beneath the stove are the bearings E for a wire or rod, *e*, to support driers for fruit, or the like.

The object of the two fire-pots is to get a greater bottom-heat, which may also be made to pass under the oven F.

One of the fire-pots can be used at a time, or both if desirable.

The dampers D will regulate the heat and draught, and I feel assured that this arrangement, however simple, unites features of utility not found in other cook-stoves.

I am aware that patent, No. 68,898, September 17, 1867, shows two fire-pots, ovens, and boilers, connected by a yoke with hot-air chamber, flues, and dampers. But my oven is not elevated, and my boilers are not arranged, as claimed, nor is my lower oven equivalent to his hot-air chamber, formed between bevel, or by the two bevel fire-pots. Nor do I use a supplementary pan, as therein claimed. I therefore disclaim such a construction and arrangement, which are not calculated for the object I have in view. Nor do I claim the two fire-pots, boilers, and dampers, separately considered.

But I am not aware that a stove, forming a plain, square, or right-angled body, with recesses for the boilers, made so as to close up, and arranged in the manner shown and described, was ever before used or known.

What I claim as my invention, and desire to secure by Letters Patent, is—

The construction and arrangement of the recess H H' for the boilers, the ovens G F, and grates, or fire-pots A A', in combination with the doors, valves, dampers, and rod-supports E, all made substantially as shown and specified.

MARY MELLINGER.

Witnesses:
WM. B. WILEY,
JACOB STAUFFER.